United States Patent
Barrho et al.

(10) Patent No.: US 6,891,289 B2
(45) Date of Patent: May 10, 2005

(54) ELECTRIC MOTOR

(75) Inventors: Guenther Barrho, Trossingen (DE); Peter Wuerfel, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/714,522

(22) Filed: Nov. 14, 2003

(65) Prior Publication Data

US 2004/0145269 A1 Jul. 29, 2004

(30) Foreign Application Priority Data

Nov. 16, 2002 (EP) .............................. 02025776

(51) Int. Cl.[7] .......................... H02K 37/14; H02K 5/15; H02K 5/16; H02K 1/12
(52) U.S. Cl. .......................... 310/49 R; 310/90; 310/91; 310/257
(58) Field of Search .............................. 310/49 R, 254, 310/257, 43, 90, 91, 40 MM

(56) References Cited

U.S. PATENT DOCUMENTS

| | | | |
|---|---|---|---|
| 3,676,577 A | * 7/1972 | Martin et al. | ............ 174/119 R |
| 3,778,896 A | * 12/1973 | Bagby | ...................... 29/603.11 |
| 3,790,834 A | 2/1974 | Tanaka | |
| 4,417,166 A | * 11/1983 | Perucchi et al. | .......... 310/49 R |
| 4,552,990 A | * 11/1985 | Persson et al. | ........ 174/117 FF |
| 5,112,649 A | 5/1992 | Bringmann et al. | |
| 5,170,082 A | * 12/1992 | Nakagawa et al. | ........... 310/45 |
| 5,523,634 A | 6/1996 | Takahashi et al. | |
| 5,663,601 A | 9/1997 | Wakabayashi et al. | |
| 6,242,096 B1 | 6/2001 | Wolter et al. | |
| 6,548,922 B1 | * 4/2003 | Takahashi et al. | ......... 310/49 R |
| 6,700,261 B2 | * 3/2004 | Mayumi | ....................... 310/91 |
| 6,707,178 B2 | * 3/2004 | Sakamoto et al. | ......... 310/49 R |
| 6,713,936 B2 | * 3/2004 | Lee | ............................. 310/257 |
| 6,762,530 B2 | * 7/2004 | Mayumi | ..................... 310/254 |
| 6,774,513 B2 | * 8/2004 | Takahashi et al. | ......... 310/49 R |
| 6,777,852 B2 | * 8/2004 | Ishikawa et al. | ............. 310/259 |

FOREIGN PATENT DOCUMENTS

WO 97/30794 8/1997

OTHER PUBLICATIONS

*Patent Abstracts of Japan*, vol. 014, No. 479, "Small–Sized Generator", Publication No. 02197243, Aug. 3, 1990.
*Patent Abstracts of Japan*, vol. 016, No. 579, "Miniature Motor", Publication No. 04229065, Aug. 18, 1992.

* cited by examiner

*Primary Examiner*—Tran Nguyen
(74) *Attorney, Agent, or Firm*—Barry R. Lipsitz; Douglas M. McAllister

(57) ABSTRACT

In order to design an electric motor with a housing, with a rotor and with a stator, each stator unit including pole shoes, formed as claw poles, as well as a coil positioned following the rotor in the direction of the rotor axis, by means of which the pole shoes can be magnetized, at low cost, it is proposed that the stator unit has two pole shoe elements of which a first pole shoe element has a first pole shoe carrier as well as first pole shoes formed integrally onto this carrier and of which a second pole shoe element has a second pole shoe carrier as well as second pole shoes formed integrally onto this carrier, and that the first pole shoe carrier carries a connecting element which establishes a magnetic circuit between the pole shoe carriers and which is fixedly connected to at least the second pole shoe carrier.

21 Claims, 5 Drawing Sheets

ELECTRIC MOTOR

The present disclosure relates to the subject matter disclosed in European application No. 02 025 776.2 of Nov. 16, 2002, which is incorporated herein by reference in its entirety and for all purposes.

BACKGROUND OF THE INVENTION

The invention relates to a brushless electric motor, in particular a micro-motor, with a housing, at least one rotor provided with magnetized regions and mounted rotatably about a rotor axis in the housing, and with a stator having at least one stator unit, each stator unit including a set of first pole shoes, formed as claw poles, and a set of second pole shoes, formed as claw poles, which are disposed around the rotor axis, as well as a coil positioned following the rotor in the direction of the rotor axis and with its windings arranged to encircle the rotor axis, by means of which the first and second pole shoes can be magnetized.

Such electric motors are known in the prior art. They are, however, expensive to manufacture.

The object of the invention is thus to design a low-cost electric motor of the type described in the opening paragraph.

SUMMARY OF THE INVENTION

This object has been achieved for an electric motor of the type described in the opening paragraph in accordance with the invention in that the stator unit has two pole shoe elements of which a first pole shoe element has a first pole shoe carrier which extends transversely with respect to the rotor axis and is disposed on one side of the coil facing the rotor, as well as the first pole shoes formed integrally onto this carrier, which first pole shoes extend away from the first pole shoe carrier in a first direction approximately parallel to the rotor axis, and of which a second pole shoe element has a second pole shoe carrier which extends transversely with respect to the rotor axis and is defined on a side of the coil facing away from the rotor, as well as second pole shoes formed integrally onto this carrier, which second pole shoes also extend in the first direction away from the second pole shoe carrier approximately parallel to the rotor axis beyond the rotor, and that the first pole shoe element is formed integrally onto the first pole shoe carrier and carries a connecting element which establishes a magnetic circuit between the pole shoe carriers, the connecting element being fixedly connected to at least the second pole shoe carrier.

The advantage of the solution presented in the invention can be seen in the fact that it enables the stator unit to be constructed simply and at a low cost.

The first pole shoe element together with the first connecting element can be produced in various ways, for example, from two pieces. A particularly low-cost and simple method of production provides that the connecting element is formed onto the first pole shoe carrier by means of deep drawing and thus can be manufactured at particularly low cost.

In principle, the connecting element can be made up of individual webs. However, a particularly suitable method of manufacturing the connecting element is when this is formed as a sleeve.

In order to integrate the coil into the stator in a simple way, it has proved favourable if the sleeve forms a winding former for the coil so that the coil can be wound directly onto the sleeve which means that no other coil carrier is needed.

Concerning the connection of the connecting element to the second pole shoe carrier, in relation to earlier embodiments it has merely been established that a rotationally fixed connection between these is necessary. It is conceivable, for example, to realise this rotationally fixed connection by a positive fit between the connecting element and the second pole shoe carrier.

However, it is particularly favourable when the connecting element is connected to the second pole shoe carrier by means of joining, since a join connection allows a fixed and precise connection between the connecting element and the pole shoe carrier to be achieved in a simple way.

A large variety of different solutions are conceivable in terms of joining connections. One such join connection could be by means of a soldered joint. A particularly favourable embodiment provides that the connecting element is welded to the second pole shoe carrier.

Welding the connecting element to the second pole shoe carrier could, for example, be achieved by friction welding.

Due to the small dimensions of the components, it has proved favourable when the weld between the connecting element and the second pole shoe carrier is effected by means of laser welding.

Here, it would be possible to provide a series of spot welds. A particularly suitable method of welding provides for the application of a weld seam circumferential to the rotor axis.

To achieve good electrical insulation between the coil and the connecting element as well as the first pole shoe carrier, it is particularly favourable if the connecting element and the first pole shoe carrier on the side facing the coil are provided with an electrically insulating coating, so that when the coil is wound directly onto the connecting element, no risk of any later electric connection to the first pole shoe carrier, such as an accidental ground, arises.

It is also preferable for the second pole shoe carrier to be provided with an electrically insulating coating on the side facing the coil.

The coating is preferably formed in such a way that it has a dielectric strength of 0.5 kV.

Moreover, the coating is then in particular applied in such a way that it has a thickness of less than 10 $\mu$m, even more preferably less than 5 $\mu$m, to prevent it from having a negative influence on the tolerances in the region of the stator unit and to provide the largest possible space for the coil.

A suitable coating provides that the coating has a glass-like consistency.

Moreover, it is preferable for the pole shoe elements of the stator unit to be provided with a corrosion resistant coating.

In the most simple case, the corrosion resistant coating is the same as the electrically insulating coating.

So far, no precise details have been given concerning the characteristics of the second pole shoes in relation to the coil. A particular favourable constructional solution in spatial terms provides that the second pole shoes overlap the coil.

So far no precise details have also been given concerning the arrangement of the first and second pole shoes in relation to each other in the context of the above description of the individual embodiments. It would thus be conceivable, for example, to locate the first pole shoes at a different radial distance from the rotor axis than the second pole shoes and have the rotor with its magnetized regions interposed, for example, between the first and second pole shoes.

A particularly favourable solution in terms of the achievable torque provides that the first and second pole shoes lie on the same cylindrical surface extending about the rotor axis and that the one pole shoes are disposed in the gaps between the other pole shoes.

Here it is advantageously provided that the pole shoes disposed one after the other in the azimuthal direction around the rotor axis have identical angular spacings from each other.

The first and second pole shoes are suitably formed in such a way that the first and second pole shoes extend so far in the first direction that their ends lie in a common plane running perpendicular to the rotor axis.

So far, no precise details have been given concerning the bearing mounting of the rotor in relation to the stator units. A favourable embodiment thus provides that the second pole shoe carrier of the stator unit is connected to the bearing support which carries a rotary bearing for the rotor.

It is particularly favourable if the bearing support can be secured to the respective stator unit by a receiving portion of the bearing support projecting into the connecting element.

In order to manufacture the electric motor according to in the invention at the lowest possible cost, it is preferable if the bearing support is made of plastics.

For the electric motor according to the invention, it is basically conceivable to provide only one stator unit. To achieve the highest possible degree of efficiency and to be able to clearly define the rotational direction of the rotor, it has proved particularly suitable if the electric motor has a stator with two stator units and a rotor having a respective rotor unit associated with each stator unit in question, the rotor units being seated on a common shaft.

The stator units can then be arranged in such a way that their respective pole shoes, formed as claw poles, point in the same direction. A particularly favourable construction, however, is when the stator units are arranged in such a way that their pole shoes face each other.

Moreover, to make the best possible use of the available space for an electric motor constructed in this way, it has been proven particularly advantageous if, for both stator units, all pole shoes are disposed on the same cylindrical surface about the rotor axis.

To achieve a solution at the lowest possible cost, a particularly favourable case provides that both of the stator units are of identical construction.

In order to clearly establish the rotational direction of the electric motor, it is favourable if holding positions of the rotor units, determined by the magnetic effect, i.e. attraction, relative to the respective stator units are rotationally displaced in relation to each other by half a pole space.

Further characteristics and advantages of the invention form the subject matter of the description below as well as the illustration in drawings of a number of embodiments.

DETAILED DESCRIPTION OF THE INVENTION

Figure 1:
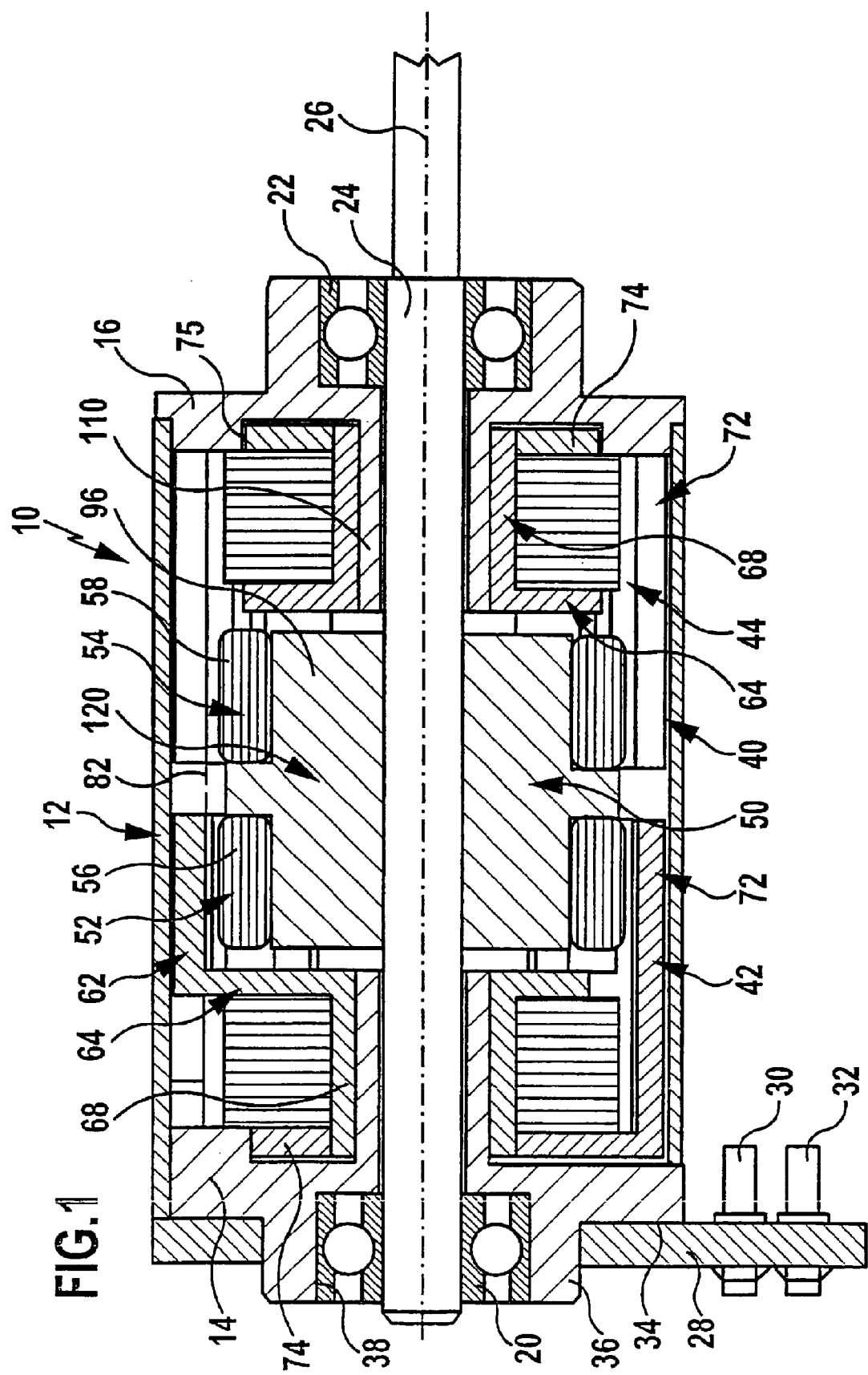
FIG. 1 a longitudinal view through a first embodiment of an electric motor according to the invention.

An embodiment of an electric motor according to the invention as illustrated in FIG. 1, preferably a stepper motor, includes a housing 10 with a housing sleeve 12 which extends between a first bearing support 14 and a second bearing support 16, both of which are fixedly connected to the housing sleeve 12.

In each of the bearing supports 14 and 16, a respective rotary bearing 20 or 22 is mounted, both preferably formed as ball bearings, by means of which a shaft 24 is mounted about an axis 26 to be rotatable with respect to the housing 10.

Moreover, the first bearing support 14 carries a connection board 28 on which electric terminals 30, 32 are disposed for connection of a power supply of the electric motor.

The connection board 28 is preferably then located on an outer surface 34 of the bearing support 14 and encloses a retaining ring 36 of the bearing support 14, which in turn forms a receptacle 38 for the rotary bearing 20.

Both a stator 40, formed by two identically constructed stator units 42 and 44 arranged in mirror image to each other, as well as a rotor 50, formed by two rotor units 52 and 54, are disposed in the housing 10, the rotor 50 with both of its rotor units 52 and 54 being seated fixedly on the shaft 24 and thus, in the same way as the motor shaft 24, being mounted about the axis 26, representing the rotor axis, by means of the rotary bearings 20 and 22, to be rotatable with respect to the housing 10. In addition, each of the rotor units 52, 54 has magnetized regions 56 and 58.

Figure 2:
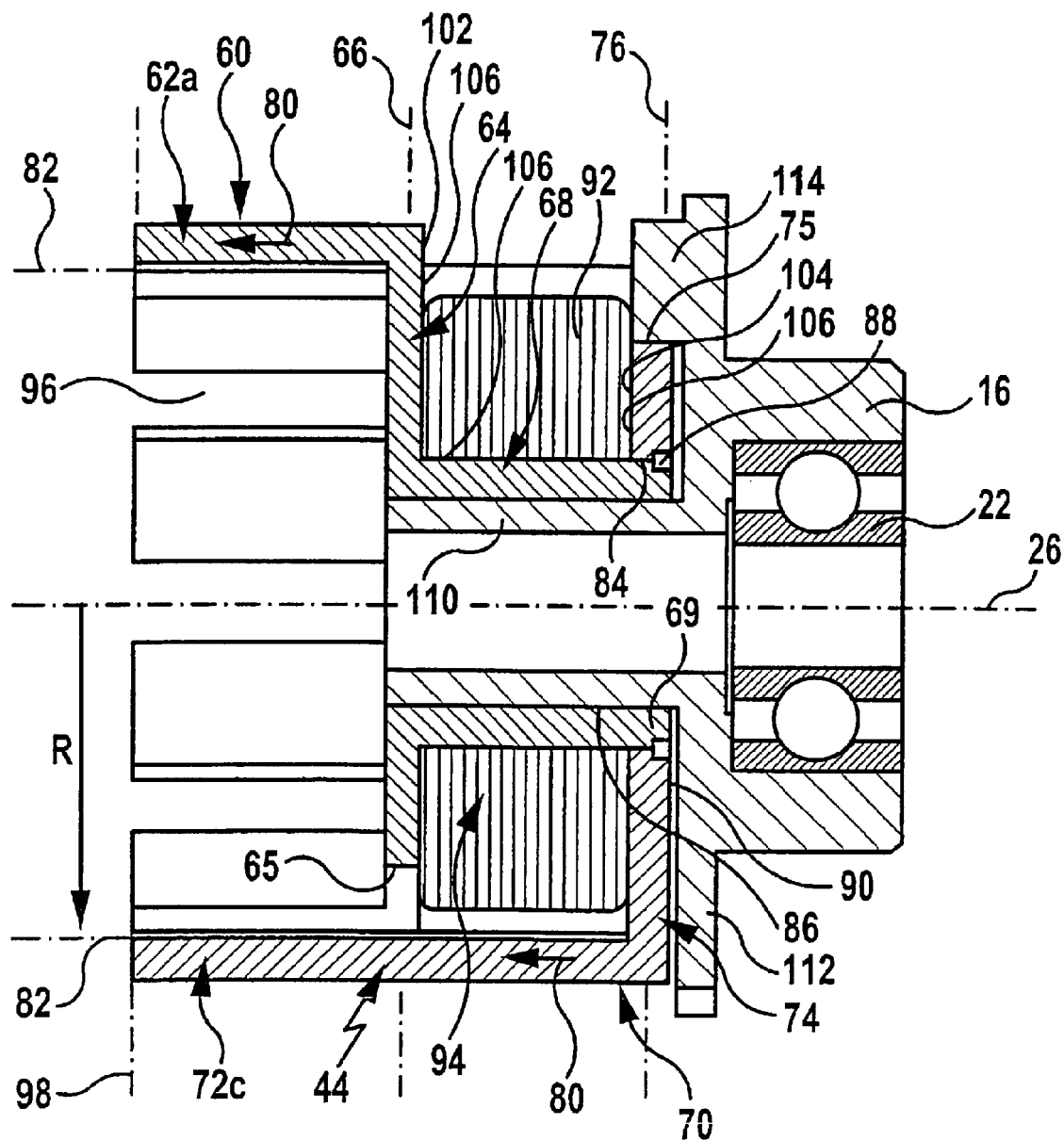
FIG. 2 an enlarged view of a stator unit of the first embodiment in a longitudinal section similar to FIG. 1 with a bearing element.
Figure 3:
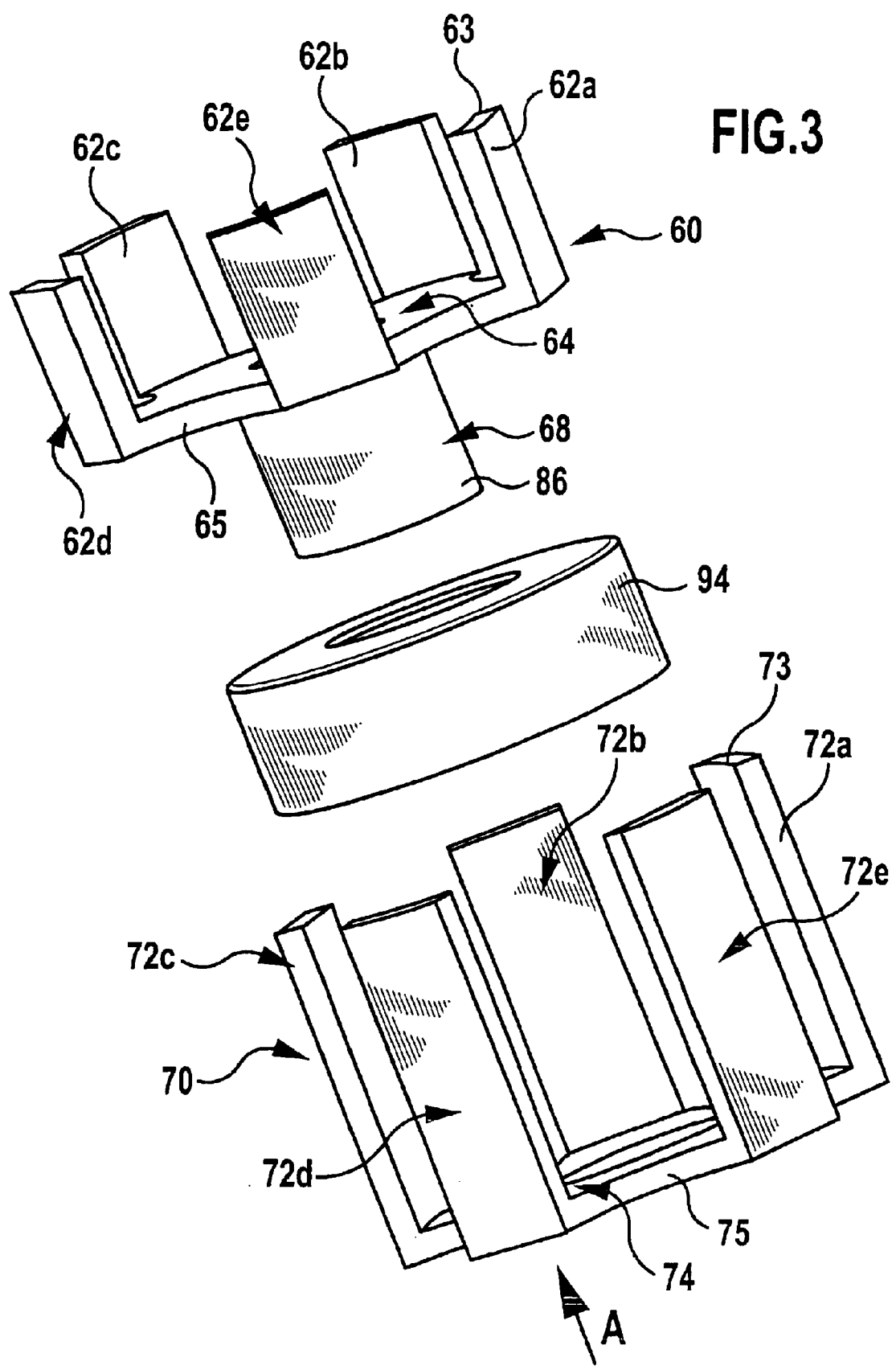
FIG. 3 an exploded view of the stator unit according to FIG. 2.

As shown in an enlarged view in FIGS. 2 and 3, the stator unit 44 includes a first pole shoe element 60, which has a first set of pole shoes 62 formed as claw poles which extend approximately parallel to the axis 26.

Here, the first set of pole shoes 62 is formed integrally on a first pole shoe carrier 64 which preferably extends in a plane 66 running perpendicular to the axis 26.

Moreover, a connecting body or connecting element 68 is formed onto the first pole shoe carrier 64 on a side lying opposite the pole shoes 62, which connecting piece or element extends away from the first pole shoe carrier 64.

Suitably, the entire pole shoe element 60 is formed by means of deep drawing, the connecting element 68 in particular being formed onto the pole shoe carrier 64 using deep drawing. The connecting element 68 then establishes a magnetic circuit from an end 69 facing away from the pole shoe carrier to a second pole shoe element 70.

The second pole shoe element 70 includes a set of second pole shoes 72a to 72e, which, in the same way as the first pole shoes 62, extend approximately parallel to the axis 26 and are formed integrally on a second pole shoe carrier 74 which preferably extends in a plane 76 perpendicular to the axis 26.

Both the first pole shoes 62 as well as the second pole shoes 72 extend from the respective pole shoe carrier 64 or 74 in the same direction 80 and are both preferably situated on a common enveloping surface 82 running circular-cylindrically to the axis 26 so that they also have the same radial distance R from the axis 26.

Seen from the direction of the axis 26, the pole shoe carriers 64 and 74 are disposed at a spacing from each other and are then fixed in relation to each other by the connecting element 68.

For this purpose in particular, the second pole shoe carrier 74 is provided with a recess 84 which in turn is seated onto an outer surface 86 in the region of the end 69 of the connecting element 68, a circumferential weld seam 88 forming a joint between the connecting element 68 and the second pole shoe carrier 74. Suitably, the weld seam 88 is applied in the region of a side 90 of the second pole shoe carrier 74 facing away from the first pole shoe carrier 64 and in the region of the recess 84 engaging onto the outer surface 86.

Here, the weld seam 88 could be a circumferential seam consisting of weld spots. It is particularly favourable, however, if the weld seam 88 is a closed circumferential seam.

The weld seam 88 is preferably achieved by laser welding.

Since the connecting element 68 holds the pole shoe carrier 74 at a spacing from the pole shoe carrier 64, a space 92 is established between these pole shoe carriers 64, 74 in which a coil 94 wound in annular manner about the axis 26 is disposed, which coil fills the space 92 between the pole shoe carriers 64 and 74 and extends in a radial direction from the outer surface 86 at the most as far as the pole shoes 72, which, starting at the second pole shoe carrier 74, project beyond the space 92 accommodating the coil 94.

This means that the coil 94 lies opposite an enclosed space 96 between the first and second pole shoes 62, 72, formed as claw poles, the space 96 being for accommodation of the respective rotor unit, in this case the rotor unit 54, offset axially in the direction of the axis 26 and moreover having a radial extension to the axis 26 which is less than the distance of the second pole shoes 72 from the rotor axis 26.

Both the first pole shoes 62 as well as the second pole shoes 72 lie with their ends 63 and 73 facing away from the respective pole shoe carriers 64 and 74 in a plane 98 which runs perpendicular to the axis 26.

Figure 4:
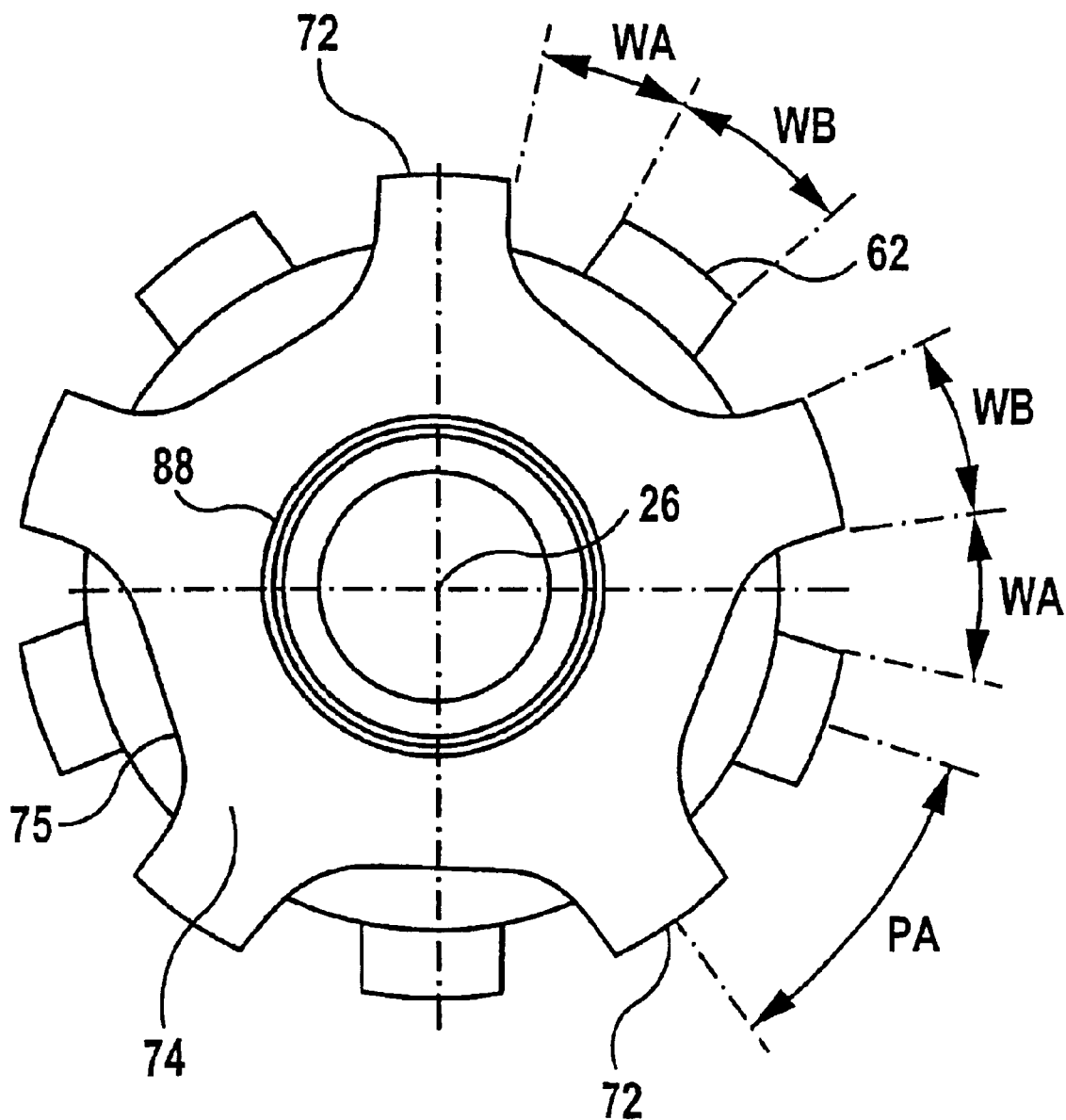
FIG. 4 a view from above of the stator unit in the direction of the arrow A according to FIG. 3, and FIG. 5 a longitudinal view similar to FIG. 1 through a second embodiment of an electric motor according to the invention.

So that the first pole shoes 62 and the second pole shoes 72 can lie on the circular-cylindrical surface 82, the first pole shoes 62 and the second pole shoes 72 are arranged staggered with respect to each other, this means that a second pole shoe 72 always lies in the middle between two first pole shoes 62 and vice versa, the pole shoes 62, 72 each extending over the same angular distance WB in an azimuthal direction with respect to the axis 26 and in addition, the same angular spacing WA existing between neighboring pole shoes 62, 72 with a pole space PA, as illustrated in FIG. 4.

Moreover, to prevent a magnetic short circuit between the second pole shoes 72 and the first pole shoe carrier 64, the first pole shoe carrier 64 is provided with cutouts 65 in regions between the first pole shoes 62, cut inwards radially to the axis 26, so that there is always a sufficiently large distance between the first pole shoe element 64 and the respective second pole shoe 72 which overlaps it.

In the illustrated embodiment of the electric motor according to the invention, the connecting element 68 is preferably formed as a sleeve between the first pole shoe carrier 64 and the second pole shoe carrier 74, the sleeve at the same time forming a winding former for the coil 94, so that the coil 94 is wound directly onto the sleeve 68 and the sleeve 68 thus not only represents the magnetic circuit between the first pole shoe carrier 64 and the second pole shoe carrier 74, but also acts as a winding former for the coil 94.

To achieve electrical insulation between the coil 94 and the pole shoe elements 60, 70 with sufficient dielectric strength, the outer surface 86 of the sleeve 68 and at least one side 102 of the first pole shoe carrier 64 facing the coil 94 as well as one side 104 of the second pole shoe carrier 74 facing the coil 94 is provided with an insulating coating 106, as shown in FIG. 2.

This coating is preferably a coating with a thickness of less than 10 μm, even more preferably less than 5 μm, which, due to its glass-like consistency, ensures sufficient electrical insulation and dielectric strength. This coating 106 is preferably a so-called CVD quartz coating.

In addition, the coating 106 offers the advantage that it has a corrosion-resistant effect, so that preferably the entire pole shoe elements 60, 70 and the connecting element are substantially provided all over with a coating 106 of this kind.

To secure the stator units 42, 44 to the bearing supports 14, 16, the bearing supports 14, 16 are provided, as shown in FIG. 2 using bearing support 16 as an example, with a retaining sleeve 110, which engages into the connecting element 68 formed as a sleeve and thus receives the entire stator unit 44 coaxially and precisely in relation to the axis 26. In addition, the bearing supports 14, 16 are provided with a supporting plate 112 which is situated on the side 90 of the second pole shoe carrier 74 facing away from the first pole shoe carrier 64.

In addition, for practical purposes the second pole carrier 74 is suitably also provided with cutouts 75, cut inwards radially to the axis 26, in the region between the pole shoes 72, into which noses 114 of the supporting plate 112 engage in order to secure the second pole shoe carrier 74, and thus the entire stator unit 44, to the respective bearing support 14, 16, fixedly with respect to the axis 26.

In the electric motor according to the invention, both stator units 42, 44 are inserted into the housing 10 in such a way that the ends 63, 73 of the respective pole shoes 62, 72 face each other and the spaces 96 for accommodation of the rotor units 52 and 54 are then also arranged facing each other.

Figure 5:
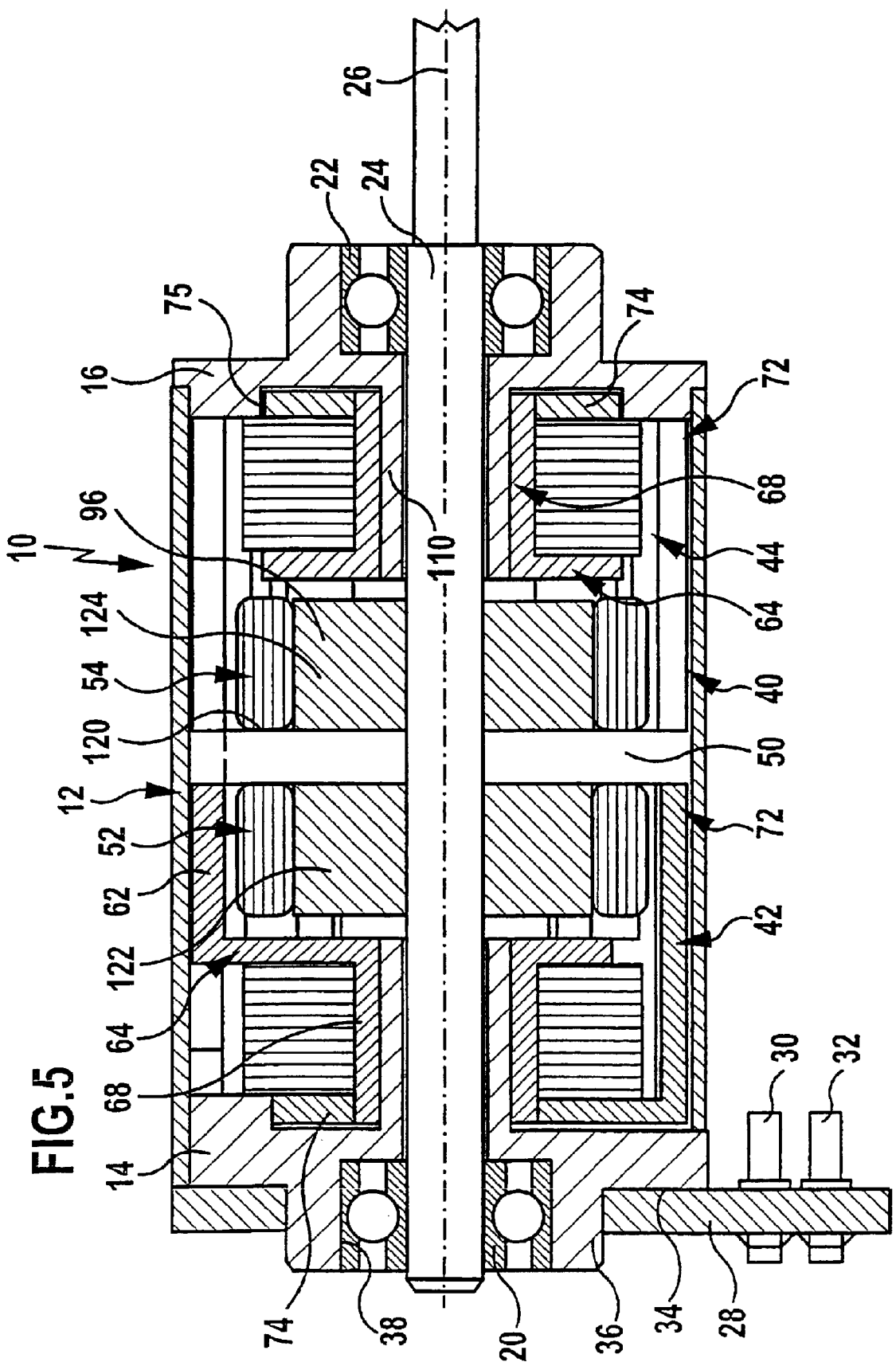

This provides the possibility, as illustrated in FIG. 1, of forming the rotor units 52 and 54 in one and the same rotor body 120 or also to split the rotor body 120, so that in the context of a second embodiment shown in FIG. 5, two rotor bodies 122 and 124 disposed one after the other in the direction of the axis 26 are provided, which also opens the possibility of a rotary alignment relative to each other.

What is claimed is:

1. An electric motor comprising:
a housing,
at least one rotor provided with magnetized regions and mounted rotatably about a rotor axis in the housing, and
a stator having at least one stator unit, each of said at least one stator units including a set of first pole shoes, formed as claw poles, and a set of second pole shoes, formed as claw poles, said first and second sets of pole shoes being disposed around the rotor axis,
a coil positioned following the rotor in the direction of the rotor axis and with coil windings arranged to encircle the rotor axis for magnetizing the first and second pole shoes,
each of said at least one stator units having two pole shoe elements:
a first pole shoe element having a first pole shoe carrier which extends transversely with respect to the rotor axis and is disposed on a side of the coil facing the rotor, the first pole shoes formed integrally onto the first pole shoe carrier such that the first pole shoes extend away from the first pole shoe carrier in a first direction approximately parallel to the rotor axis, and a second pole shoe element having a second pole shoe carrier which extends transversely with respect to the rotor axis and is disposed on a side of the coil facing away from the rotor, the second pole shoes formed integrally onto the second pole shoe carrier such that the second pole shoes extend in the first direction away from the second pole shoe carrier approximately parallel to the rotor axis beyond the rotor, the first pole shoe element carrying a connecting element which is formed integrally onto the first pole shoe carrier and establishes a magnetic circuit between the pole shoe carriers, the connecting element being fixedly connected to the second pole shoe carrier, the second pole shoe carrier is connected to a bearing support which carries a rotary bearing for the rotor; and a receiving portion of the bearing support engages into the connecting element.

2. An electric motor according to claim 1, wherein the connecting element is deep drawn from the pole shoe carrier.

3. An electric motor according to claim 1, wherein the connecting element is formed as a sleeve.

4. An electric motor according to claim 3, wherein the sleeve forms a winding former for the coil.

5. An electric motor according to claim 1, wherein the connecting element is joined to the second pole shoe carrier.

6. An electric motor according to claim 5, wherein the connecting element is welded to the second pole shoe carrier.

7. An electric motor according to claim 1, wherein the connecting element and the first pole shoe carrier are provided with an electrically insulating coating on the side facing the coil.

8. An electric motor according to claim 7, wherein the second pole shoe carrier is provided with an electrically insulating coating on the side facing the coil.

9. An electric motor according to claim 7, wherein the coating has a thickness of less than 10 $\mu$m.

10. An electric motor according to claim 7, wherein the coating has a glass-like consistency and comprises quartz.

11. An electric motor according to claim 1, wherein the pole shoe elements are provided with a corrosion-resistant coating.

12. An electric motor according to claim 1, wherein the second pole shoes overlap the coil.

13. An electric motor according to claim 1, wherein the first and second pole shoes lie on the same cylindrical surface which extends about the rotor axis and that the first pole shoes are disposed in the gaps between the second pole shoes.

14. An electric motor according to claim 13, wherein the pole shoes disposed successively in an azimuthal direction around the rotor axis have identical angular spacings from each other.

15. An electric motor according to claim 14, wherein the first and second pole shoes extend in the first direction such that their ends lie in a common plane running perpendicular to the rotor axis.

16. An electric motor according to claim 1, wherein the bearing support is made of plastics.

17. An electric motor according to claim 1, wherein the electric motor has a stator, two stator units and a rotor having a respective rotor unit associated with each stator unit, the rotor units being seated on a common shaft.

18. An electric motor according to claim 17, wherein the stator units are arranged in such a way that their pole shoes face each other.

19. An electric motor according to claim 17, wherein for both stator units, all pole shoes are disposed on the same cylindrical surface around the rotor axis.

20. An electric motor according to claim 17, wherein both of the stator units are of identical construction.

21. An electric motor according to claim 17, wherein holding positions of the rotor units, determined by magnetic effect, relative to the respective stator units, are rotationally displaced in relation to each other by half a pole space.

* * * * *